Jan. 1, 1924
A. AMES, JR
APPARATUS FOR COMPOSITE PHOTOGRAPHY
Filed Oct. 25, 1921
1,479,212
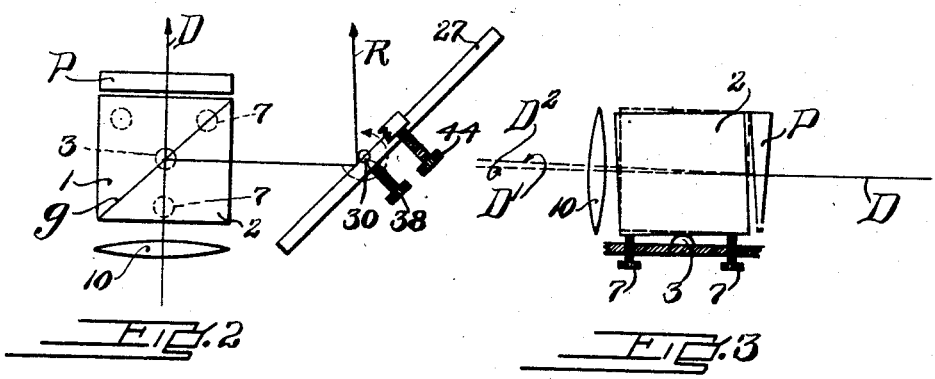
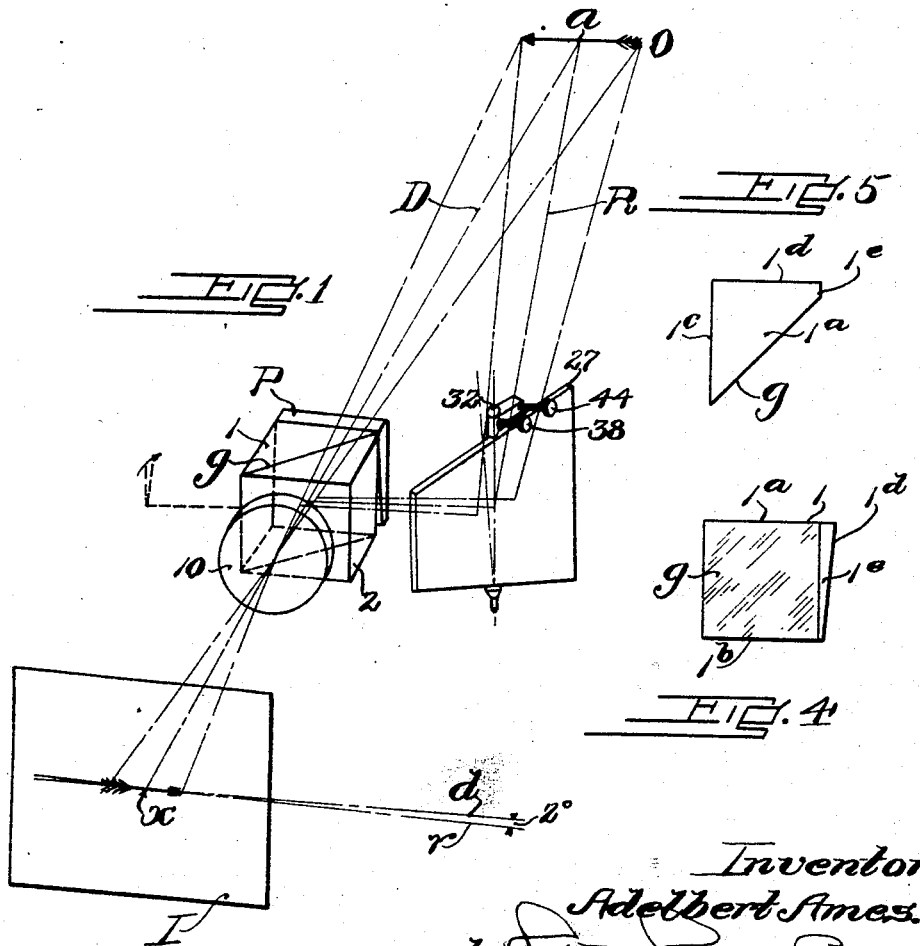
Inventor
Adelbert Ames, Jr.
by Roberts, Roberts & Cushman
his attys.

Patented Jan. 1, 1924.

1,479,212

UNITED STATES PATENT OFFICE.

ADELBERT AMES, JR., OF TEWKSBURY, MASSACHUSETTS.

APPARATUS FOR COMPOSITE PHOTOGRAPHY.

Application filed October 25, 1921. Serial No. 510,287.

*To all whom it may concern:*

Be it known that I, ADELBERT AMES, Jr., citizen of the United States of America, and resident of Tewksbury, in the county of Middlesex and State of Massachusetts, have invented new and useful Improvements in Apparatus for Composite Photography, of which the following is a specification.

This invention relates to apparatus for photography and the like in which images from two different points of view are superposed to form a single impression on the sensitive surface. In my application jointly with Charles A. Proctor, filed June 2, 1921, Serial No. 474,560, I have shown apparatus of the type referred to and upon which the present devices are an improvement. This apparatus comprises means for forming a composite image upon a sensitive surface adapted to utilize the full aperture of a single lens and having therein light dividing means in front of this lens comprising a light transmitting and reflecting surface arranged at an angle to the axis of the photographic lens, and cooperating with an adjustable mirror at one side of the light dividing means, the transmitted beam and the reflected beam of light from said mirror and one surface of the light dividing means both being brought to a focus by the photographic lens, in order to make an image which is the composite of the respective points of view represented by the mirror and the axis of the photographic lens.

One object of the use of such apparatus is to produce a photograph in which the region of best definition in respect to the image corresponds to a center of interest in the object field, the adjustable mirror and the light dividing reflector in the said apparatus being such as to cause an object in the object field at the point of convergence of the optical axis of the lens and the said axis as reflected to correspond to a point in the image field upon which the images respectively are in exact registry. The image photographed is thus sharp at this point, and aberrated or confused elsewhere in the field, as in the case of normal binocular vision.

Photographs made with said apparatus are, however, selectively better defined with respect to objects having lateral linear extent than with respect to objects having a predominantly vertical dimension or edge, as a consequence of the virtual lateral separation of the points of view.

It is an observed fact that in the case of normal human binocular vision, there is no selective better definition of images of objects out of the line of sight in respect to lines in horizontal planes. This follows from the fact that normal human eyes are rotated for convergence upon objects of different distances about axes which are not parallel, but which, on the contrary, converge at a point above the eyes; normally these axes are about 2° apart.

I have found that I can improve the illusiveness of the pictures made by my said apparatus by providing for the elimination of good definition, except at the center of interest, in respect to horizontal lines, and in order to do this I have devised means for causing the apparatus to rotate the images of one component of its composite pictures through about the same angle as the angle between the axes of the human eye.

Beside the advantage gained in accentuating the center of good definition, the rotation of the fields one in respect to the other gives an effect of depth when any part of the field of view consists of an irregular pattern such as trees, leaves, grass or a carpet.

The effect of depth is caused by the fact that the slight angular displacement of the irregular pattern produces a series of whirls. The apparent center of rotation of these whirls varies according to whether the irregular pattern lies nearer or farther than the convergence point. If it lies beyond the convergence point, as distant trees, the center of the whirls is above and outside the picture. As the pattern is drawn nearer, the fixation being kept constant, the apparent center of the whirls keeps getting lower. A sense of the distance of the irregular pattern is given by the character of these whirls.

By way of example, I herein illustrate certain modifications of the apparatus adapted to reach this effect, but it will be understood that the specific instances shown and described are selected for examples only of the genus of apparatus comprising the invention.

In the accompanying drawings:

Fig. 1 is a diagram in perspective of the apparatus illustrating its effect;

Fig. 2 is a diagram plan view;

Fig. 3 is a right-hand elevation of parts of the apparatus shown in Fig. 2; and

Figs. 4 and 5 are respectively side elevation and plan of a modified form of prism.

The apparatus may comprise plane-faced 90° prisms 1 and 2 conjoined at hypothenuse the plane $g$, which is half-silvered or half platinized to provide a light dividing surface adapted equally to transmit and to reflect light incident upon it. The compound prism 1, 2 is mounted for universal motion about the point 3, as controlled by the adjusting screw 7 for instance, and this structure is mounted in the relation shown to the axis of the lens 10, so that the axis of the lens extends about centrally through the plane $g$, which is normally vertical. At one side of the compound prism 1, 2 a plane mirror 27 is mounted for rotation in azimuth about the axis 30, as controlled by the adjusting screw 44; the axis 30 is also adapted to be rocked upon one of its ends, for instance by the adjusting screw 38, to bring the reflected image into coincidence with the direct image in a vertical sense. The respective axes of the direct and the reflected images are shown in Figs. 1 and 2 at D and R respectively. It will be observed, so far as described, that when a point $a$ of the object O produces a point $x$ of the images in coincidence on the image plane I, that then the surface 27 and the surface $g$ necessarily have parallel vertical elements, and that therefore the horizontal linear regions of the image of a horizontal object O are necessarily in coincidence, so that vertical aberration or diffusion of the image toward the margins of the image plane I exists only as a consequence of the different distances of respective parts of the object from the respective points of view represented by the central region of the plane $g$ and the central region of the mirror 27. Objects including horizontal lines are therefore comparatively well defined vertically toward the margins of the image plane I.

According to the present invention the optical elements are so combined and arranged that the reflected image and the direct image are not coincident upon any linear dimension, but only at a point or region $x$ of the image, without preference for the horizontal. The preferred device for this purpose consists in means for deflecting the rays in one of the said direct or reflected paths. As shown, a prism P of suitable narrow angle is mounted with its base upward in contact with or near the incidence face of the prism 1. The effect of this prism is to bend the direction D upward by refraction, as shown at D' in Fig. 3, away from the normal direction $D^2$ in the image region of the lens behind the prism P, Fig. 3. Tipping of the prisms will now bring the reflected beam R, which normally passes along $D^2$ into coincidence with D', but this will rotate the reflected image axially through a corresponding angle. If the mirror 27 and the screws 7 are now carefully adjusted to bring the images of central point $a$ of the object into exact coincidence at $x$, it will be found that the horizontal dimension of the object O is in a different position in respect to the direct and reflected images at I. This departure is illustrated in Fig. 1, the direct image having its horizontal lines central upon the line $d$ and the reflected image having its horizontal lines central upon the direction $r$. The preferred angle of separation for these two components of the image is about 2°, as shown.

As illustrated in Figs. 4 and 5, I may in some cases form the prism P as an integral part of the prism 1, which is thus provided with an upper surface 1ª and a lower surface 1ᵇ at right angles to its hypothenuse face $g$, with a face 1ᶜ at 45° to the plane $g$, and with an inclined face 1ᵈ perpendicular to the face 1ᶜ and intersecting the faces 1ª and 1ᵇ at an angle other than 90°. The lateral face 1ᵉ may be dressed off as shown. It will be observed that the prism shown in Figs. 4 and 5, as well as the prism shown in the remaining figures, constitutes means for refractively bending one of the component beams of light from which the composite image is formed in a direction at an angle to the direction separating the virtual points of view constituted by the optical axis and the lateral reflector.

I claim:

1. Apparatus for composite photography from laterally separated points of view having therein means for forming images respectively from said points of view, and means for causing the images to be rotated to a predetermined extent in respect to each other about a center of coalescence common to the component images.

2. Apparatus for composite photography from laterally separated points of view having therein refractive means for rotating the image from one point of view in respect to that from the other point of view.

3. Apparatus for composite photography from laterally separated points of view having therein means for forming images including a reflected image from one of the laterally separated points, and means for rotating one of the images in respect to the other.

4. Apparatus for composite photography of images from laterally separated points of view having therein means for forming the images by light taking direct and reflected paths respectively, the images being in coalescence upon a center of interest, and having means in one of said paths for deflecting its direction away from the plane of the reflected path.

5. Apparatus for composite photography of images from laterally separated points of view having therein means for forming the images by light taking direct and reflected paths respectively, the images being in coalescence upon a center of interest, and having means in one of said paths for deflecting its direction away from the plane of the reflected path and means for bringing the deflected and the other images into coincidence at the center of interest.

6. Apparatus for composite photography of images from different points of view having therein refractive means for the prevention of coincidence of the respective component images at points away from the coincident axes of the respective images.

7. Apparatus for composite photography of images from different points of view having therein refractive means for the prevention of coincidence of the respective component images at points away from the coincident axes of the respective images comprising a prism introduced in the path of light forming one of the component images.

8. In apparatus for the composite photography of images from different points of view, the combination of a lens, light-transmitting and reflecting means, a laterally-placed adjustable mirror for reflecting light from the object to the light-transmitting and reflecting means; means for adjusting the mirror in two dimensions; and means for deflecting the path of the light transmitted by said light-transmitting and deflecting means, whereby adjustment of the mirror for coalescence of the images upon a center of interest causes such coalesence without simultaneously causing coalescence of the images of lines in the object.

Signed by me at Hanover, New Hampshire, this 13th day of October, 1921.

ADELBERT AMES, Jr